United States Patent

Hasegawa

[11] Patent Number: 5,941,941
[45] Date of Patent: Aug. 24, 1999

[54] BIT WIDTH CONTROLLING METHOD

[75] Inventor: Satoshi Hasegawa, Tokyo, Japan

[73] Assignee: NEC Corporation, Tokyo, Japan

[21] Appl. No.: 08/943,141

[22] Filed: Oct. 3, 1997

[30] Foreign Application Priority Data

Oct. 11, 1996 [JP] Japan .................................. 8-269709

[51] Int. Cl.[6] .................................................... G06F 7/38
[52] U.S. Cl. .................................... 708/551; 708/524
[58] Field of Search ..................... 364/715.08, 736.04, 364/745.01, 745.02, 748.03; 395/823, 886, 306, 307; 708/209, 524, 550, 551, 497, 620; 710/3, 66, 126, 127

[56] References Cited

U.S. PATENT DOCUMENTS

| | | | |
|---|---|---|---|
| 4,947,366 | 8/1990 | Johnson | 364/823 |
| 5,548,766 | 8/1996 | Kaneko et al. | 395/307 |
| 5,802,399 | 9/1998 | Yumoto et al. | 395/886 |

FOREIGN PATENT DOCUMENTS 6-152417  5/1994  Japan .

*Primary Examiner*—David H. Malzahn
*Attorney, Agent, or Firm*—Foley & Lardner

[57] ABSTRACT

In the case that the bit width of a high-speed internal calculation of CPU or DSP is restricted and the high-speed internal calculation is performed as a fixed-point calculation, and the bit width of the input data of CPU or DSP is different from the bit width of the high-speed internal calculation, the input digital signal is truncated prior to the internal calculation. After the high-speed internal calculation has completed (at step S2-3), the result of the high-speed internal calculation is shifted in the direction reverse to that of the truncation by a predetermined bit width (at step S2-4). Thus, the gain of the output signal of the CPU or DSP is prevented from decreasing while performing the high-speed internal calculation.

4 Claims, 7 Drawing Sheets

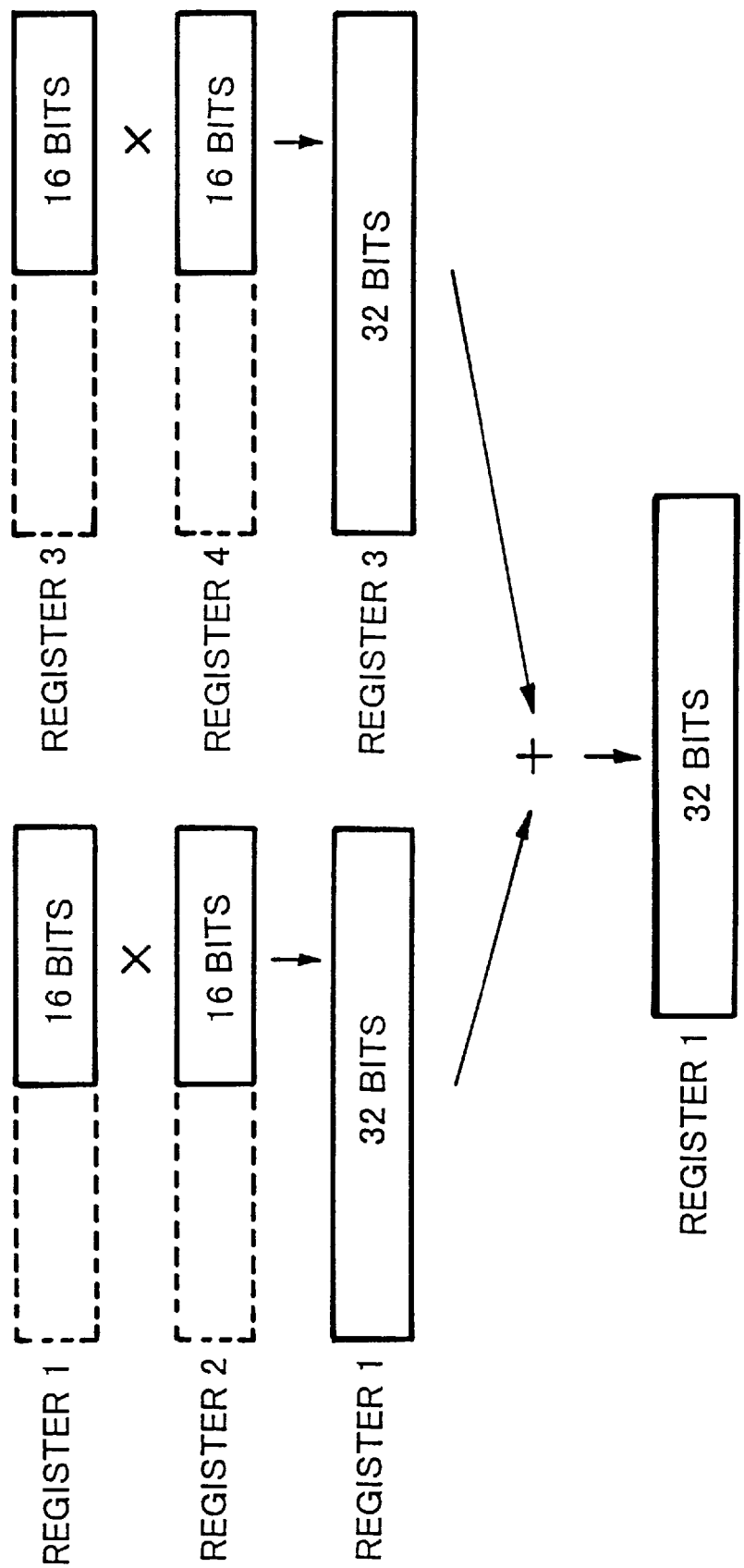
F I G. 3

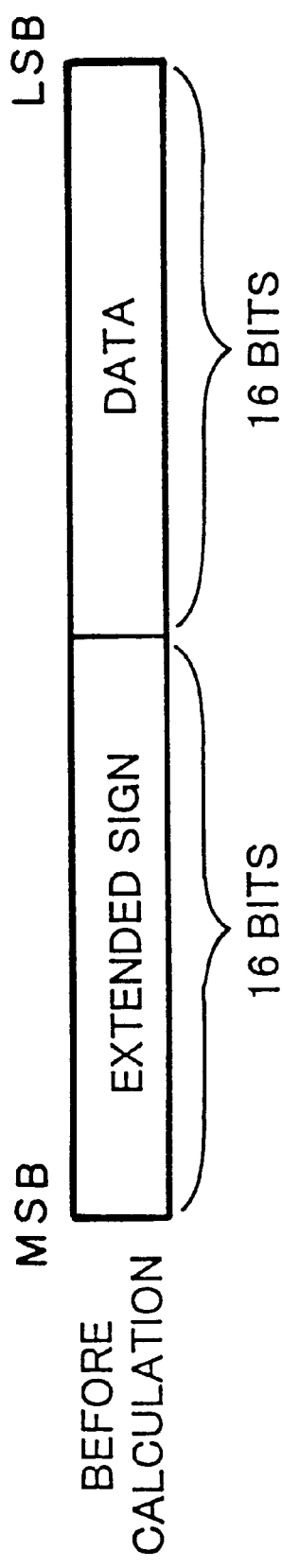
F I G. 4A
BEFORE CALCULATION
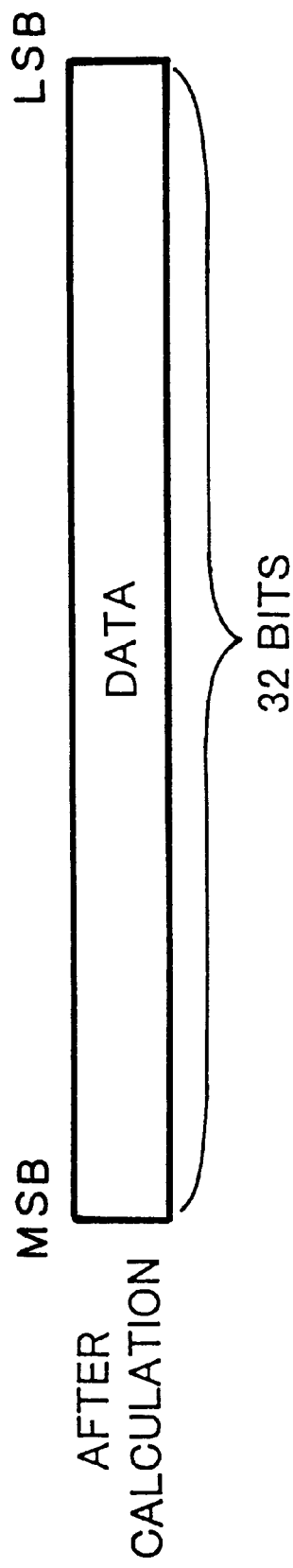
F I G. 4B
AFTER CALCULATION

BIT WIDTH CONTROLLING METHOD

BACKGROUND OF THE INVENTION

1. Field of the Invention

The present invention relates to a subsidiary digital signal process for recovering the dynamic range of an input signal from the result of the main digital signal process which is executed with a bit width that is smaller than that of an input signal.

2. Description of the Related Art

With the advent of high-speed and high-accuracy CPUs (Central Processing Units) and DSPs (Digital Signal Processors), calculating processes for signals have been remarkably improved. Because of the improvement of the performance of the CPUs and DSPs, the overall signal processes are performed at high speeds. On the other hand, in order to further increase the calculation speed, newer types of CPUs and DSPs have been developed. For the same purpose, new instruction sets have also been developed. It is expected that the performance of digital signal processes will be improved with the newer forthcoming CPUs and DSPs.

As the performance of such CPUs and DSPs is improved, high-performance A/D converters and D/A converters as peripheral units are required. As one example of A/D converters, Japanese Patent Laid-Open Publication No. 6-152417 discloses an A/D converter used in a modem which over-samples an input signal to output a signal which is free from calculation error due to truncation and is of high S/N ratio. Additionally, this A/D converter changes its dynamic range according to the power of the input signal.

In this related art reference, when the bit width of an output signal of a down-sampling circuit in the A/D converter is larger than the bit width of an output signal of the A/D converter, the output signal of the down-sampling circuit is truncated so that the bit width thereof matches the bit width of the output signal.

When the bit width of the final output signal is 16 bits, there are two types of truncation methods. One of the two types of truncation methods is selected in an alternative way corresponding to the power detected in a predetermined time period. As one of the two types, the output signal of the down-sampling circuit is leftwardly shifted by a predetermined bit width and truncated into 16-bit data. As the other type, the output signal of the down-sampling circuit is rightwardly shifted into 16-bit data. According to the forementioned related art reference, with the two types of truncation methods, the dynamic range is changed corresponding to the power of the input signal.

In the related art reference, the gain is adjusted after the analog signal is input to the A/D converter and digitized. In the case that the digital audio signal is processed by fixed-point calculations on a CPU or DSP and the bit width of the input audio data is equal to the bit width of the output digital audio signal and the bit width of data of the internal calculations is smaller than the bit width of the input/output data, if the input data is bit-shifted and truncated into the bit width equal to that of the internal calculations, the gain of the final digital audio data is decreased in comparison with the gain of the input data. Thus, the output gain becomes smaller than the input gain.

Therefore, the output gain of the digital audio signal process should be adjusted to match to the input gain.

When the CPU that can execute the same fixed-point calculations of a certain number of bit in parallel is used, the calculations can be performed at high speed. However, if the bit width of the parallel calculations is different from the bit width of the input data, the parallel calculations cannot be performed. Thus, to perform the parallel calculation, the input data must be truncated within the bit width of the parallel calculations.

SUMMARY OF THE INVENTION

An object of the present invention is to process a digital audio signal at high speed by completely using the functions of a high speed CPU or DSP.

Another object of the present invention is to prevent the high-speed process from decreasing the gain of the digital audio signal.

According to the present invention, there is provided A bit width controlling method for a processor which performs high-speed fixed-point calculations with data of fixed number of bit, which comprises the steps of truncating an input signal of which the bit width is different from said fixed number of bit prior to said high-speed fixed-point calculation and shifting the result of said high-speed fixed-point calculation by the number of bit which is selected thereby to prevent the gain of the intermediate or final output signal from changing as compared to said input signal.

These and other objects, features and advantages of the present invention will become more apparent in light of the following detailed description of best mode embodiments thereof, as illustrated in the accompanying drawings.

BRIEF DESCRIPTION OF DRAWINGS

FIG. 3 is a schematic diagram showing an example of the structure of the registers of the CPU and an example of a calculation thereof;

FIG. 4A is a schematic diagram showing the state of data before calculation according to the embodiment of the present invention;

FIG. 4B is a schematic diagram showing the state of data after calculation according to the embodiment of the present invention;

DESCRIPTION OF PREFERRED EMBODIMENTS

Figure 1:
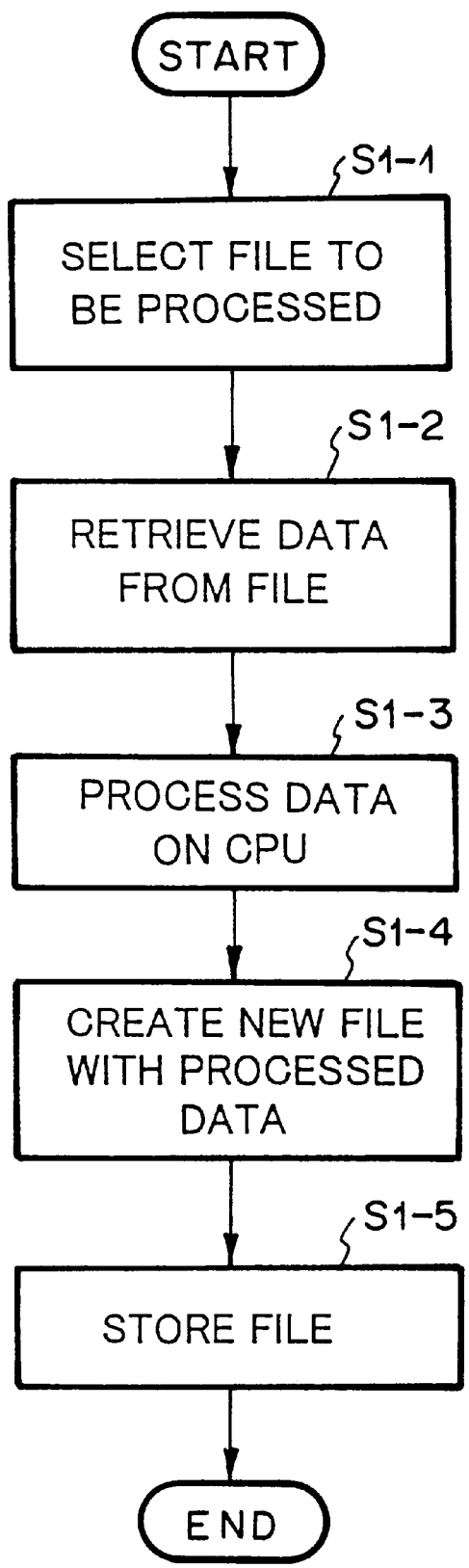
FIG. 1 is a flowchart showing an outline of a process according to an embodiment of the present invention.

Next, with reference to the accompanying drawings, an operation of an embodiment of the present invention will be explained. FIG. 1 is a flow chart showing an example of a process for digital audio data (hereinafter referred to as data) performed in a terminal unit such as a personal computer. Data to be processed is retrieved from a file. After the data is processed by the CPU, the resultant data is stored as a file.

Assuming that a file to be processed is stored in an external storing unit such as a hard disk, the file is read from the external storing unit (at step S1-1). Data is extracted from the file and then stored in a memory (at step S1-2). Next, the data is processed by the CPU (at step S1-3). Thereafter, with the resultant data, a new file is formed (at step S1-4). The file is stored in the external storing unit (at step S1-5). In such a manner, the signal process is executed.

Figure 2:
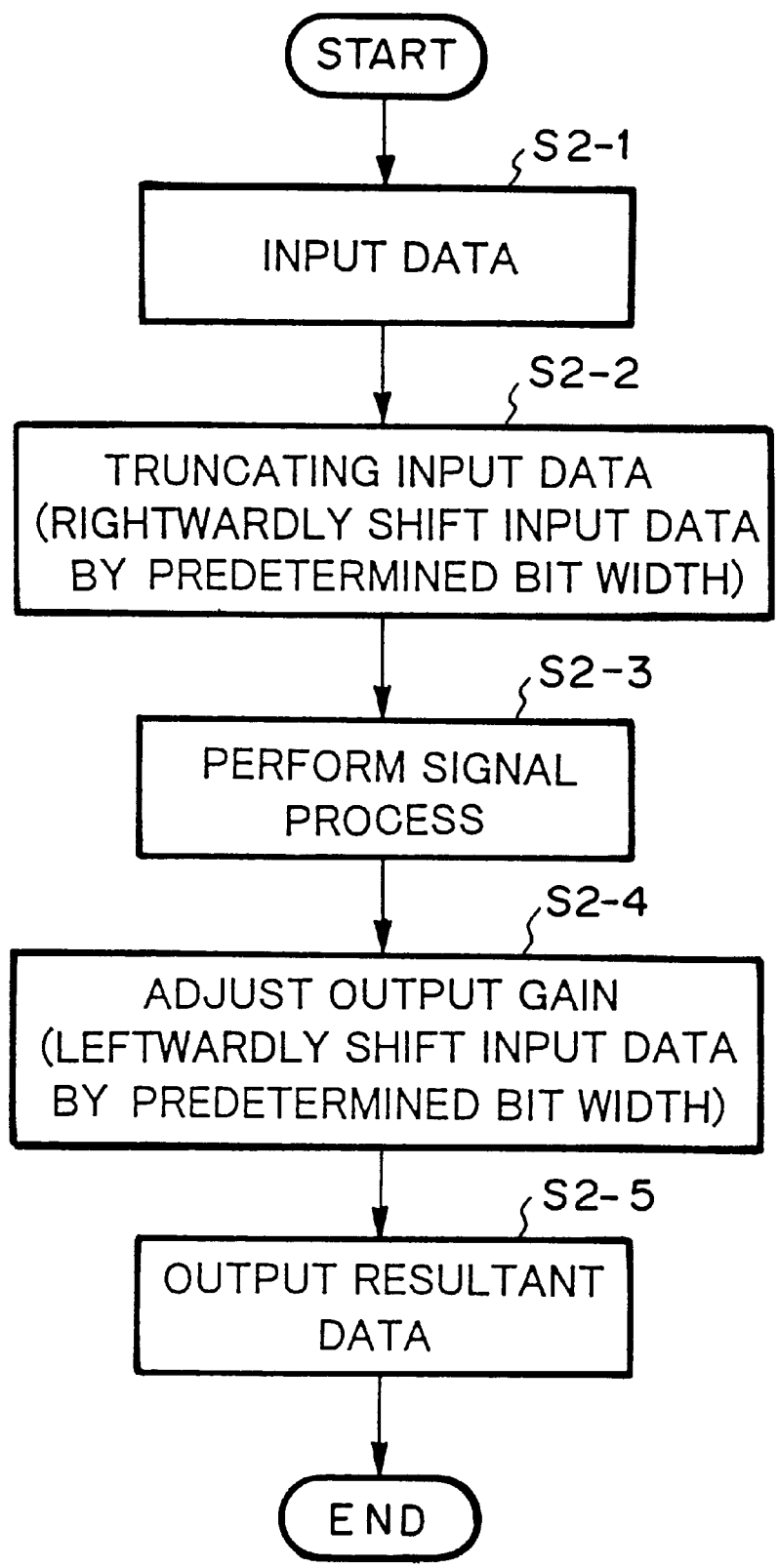
FIG. 2 is a flow chart showing the process of a CPU according to the embodiment of the present invention.

FIG. 2 is a flow chart showing an example of a signal process of the CPU in the process shown in FIG. 1. Data is input to the CPU (at step S2-1). When the bit width of the data is larger than the bit width of data that can be processed by the CPU, the input data is rightwardly shifted by a predetermined number of bit so as to truncate the bit width of the input data to the bit width of the data processed by the CPU (at step S2-2). Thereafter, the signal process is performed for the truncated data (at step S2-3) However, since the input data has been rightwardly shifted by the predetermined number of bit at step S2-2, the gain of the calculation result is lower than the gain of the original data. Thus, the dynamic range of the signal is decreased. To compensate the dynamic range, the calculated data is leftwardly shifted by the predetermined number of bit, whereby the gain is adjusted (at step S2-4). Thus, the dynamic range of the signal can be recovered. Last, the resultant data is output (at step S2-5). Consequently, the signal process performed by the CPU is completed.

FIG. 3 is a schematic diagram showing contents of internal registers of the CPU and an example of a calculation thereof with the registers. In FIG. 3, a product-sum calculation is performed.

FIG. 4A is a schematic diagram showing a state of data that has been extracted from a file. FIG. 4B is a schematic diagram showing a state of data after the calculations shown in FIG. 3 have been performed.

Figure 5:
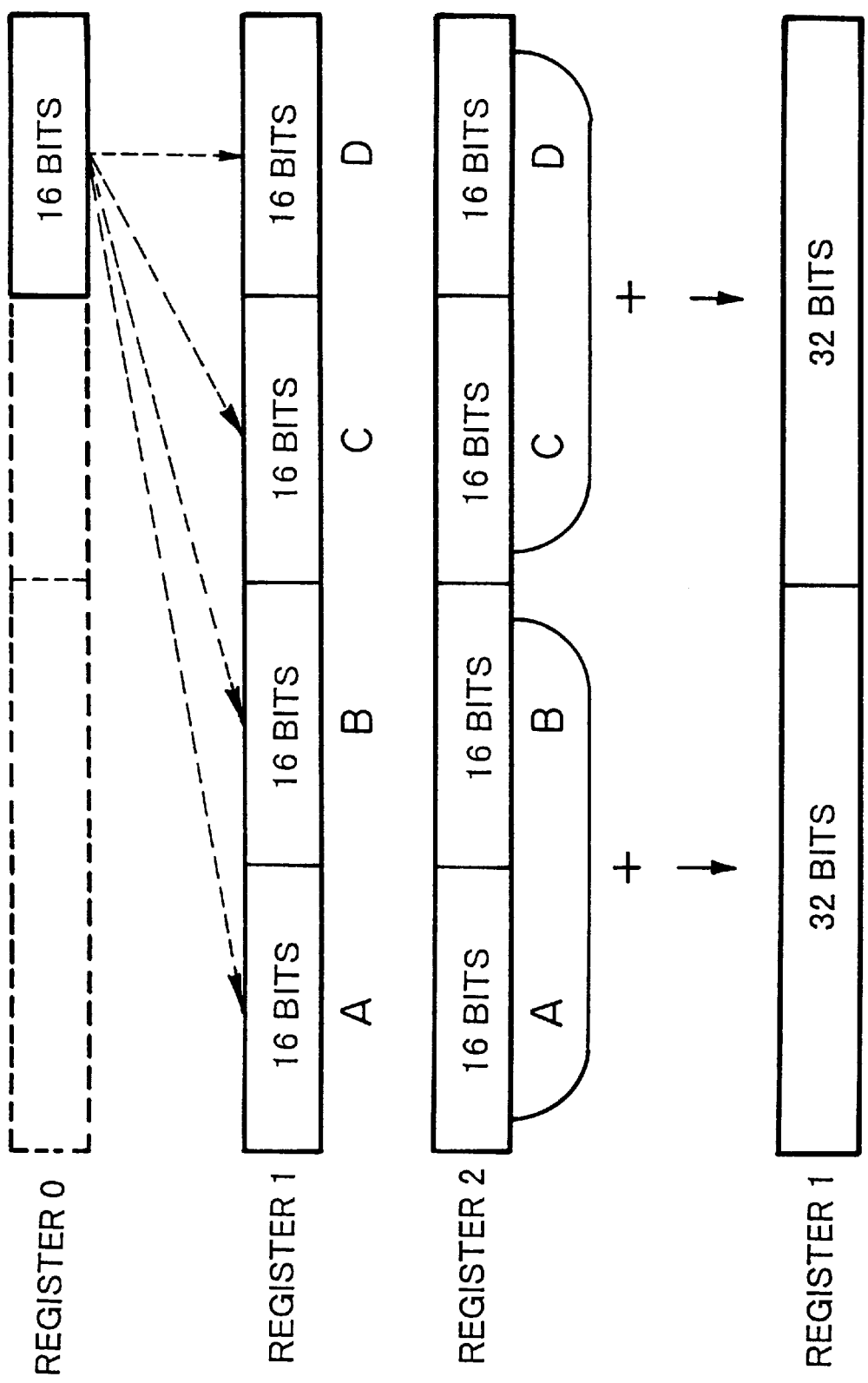
FIG. 5 is a schematic diagram showing an example of registers of the CPU and an example of a parallel calculation thereof.
Figure 6:
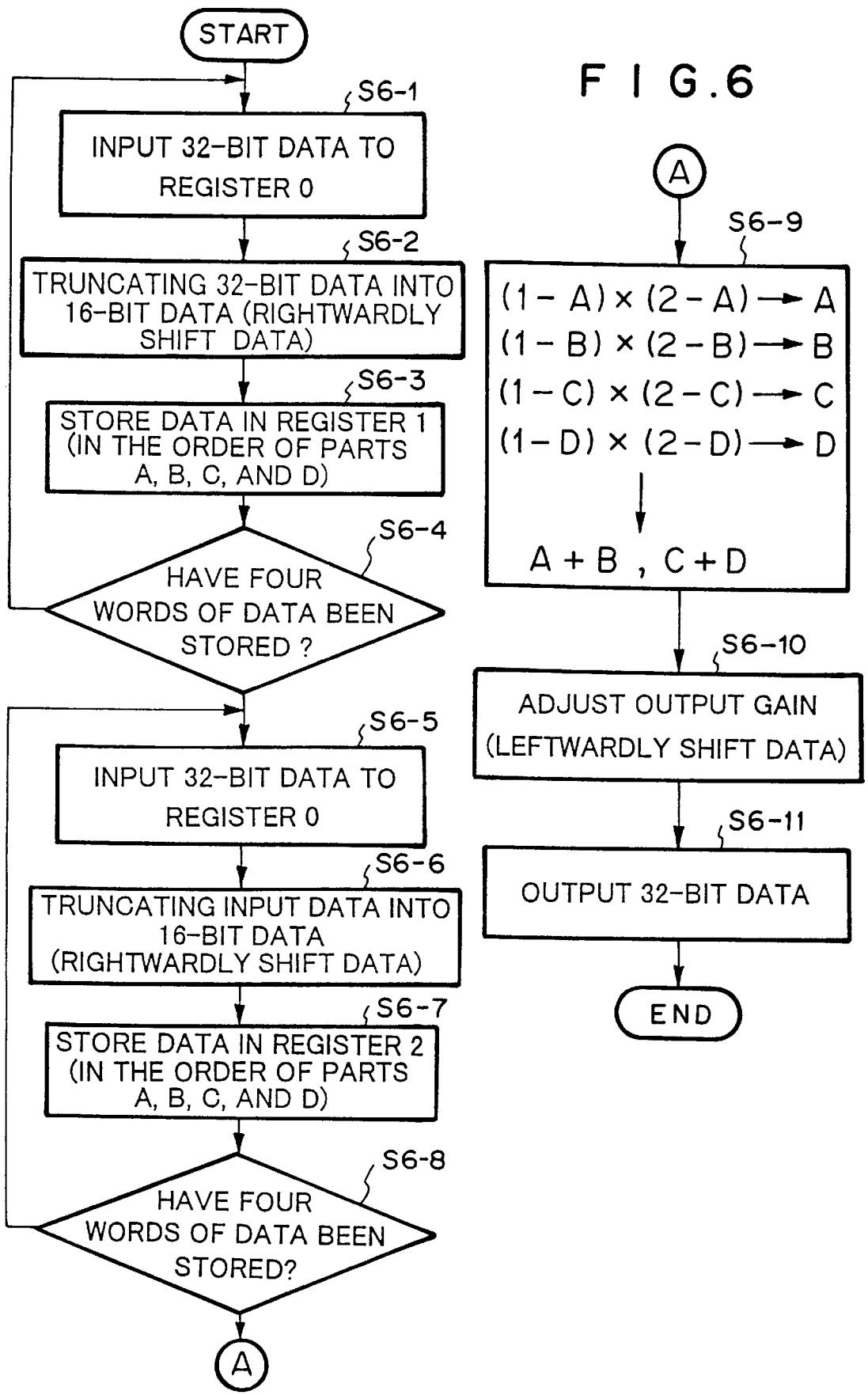
FIG. 6 is a flow chart showing the process of the parallel calculation shown in FIG. 5.
Figure 7:
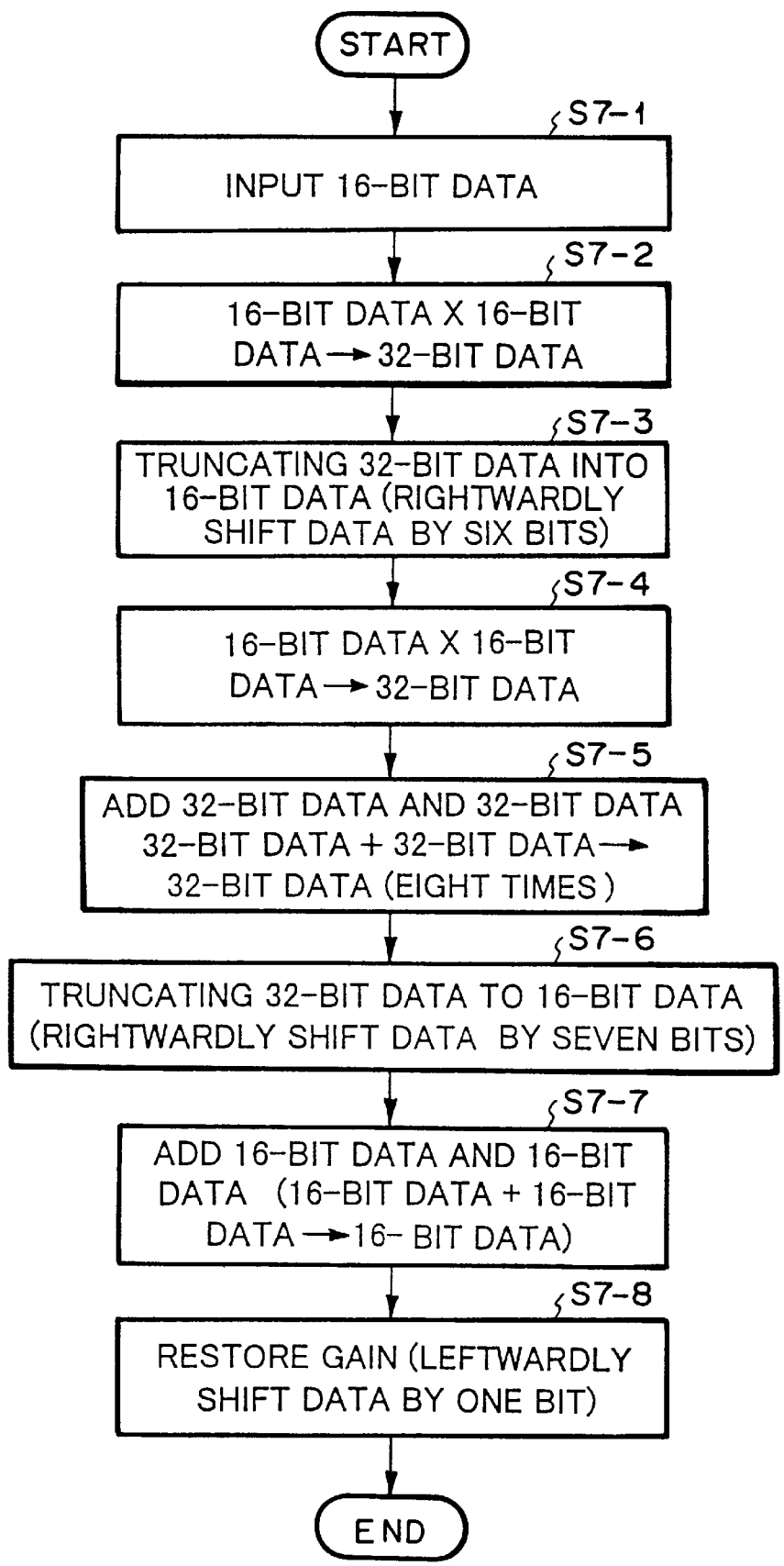
FIG. 7 is a flow chart showing the process of the CPU in the case that a sub-band dividing filtering process is performed according to another embodiment of the present invention.

FIG. 5 is a schematic diagram showing the structure of registers of the CPU that performs a parallel calculation and an example the parallel calculation thereof with the registers.

Next, with reference to FIGS. 1, 2, 3, and 4, the operation according to the embodiment of the present invention in the case that calculations are performed by the CPU will be explained.

As shown in FIG. 3, a product-sum calculation will be explained. Referring to FIG. 3, the CPU has four 32-bit registers. It is assumed that a multiplication is performed by using the low-order 16 bits of each register. On the other hand, an addition can be performed by using 32 bits of each registers.

Data to be processed is stored in an external storing unit such as a hard disk. The CPU extracts data in the data format as shown in FIG. 4A. Although the bit length of the input data is 32 bits, the high-order 16 bits are of extended sign. Effective data is stored in the low-order 16 bits. In this case, the high-order 16 bits are omitted. Only the low-order 16 bits are stored in the registers and form the input of the calculation.

It is assumed that data is input to low-order 16 bits of each of four registers. The result of multiplication between the contents of registers 1 and 2 is stored in register 1. The result of multiplication between the contents of registers 3 and 4 is stored in register 3. Finally, the content of register 3 is added to the content of register 1 and the sum is stored in register 1. Thus, the product-sum calculation is completed. Since the result of the multiplication between two 16-bit data is represented by 32 bits, an addition is performed with 32 bits. Finally, the result of the calculation of 32 bits can be obtained as shown in FIG. 4B.

With the calculated results of 32 bits shown in FIG. 4B, a product-sum calculation is performed once again in the following manner. Although the bit width of the input data of product-sum calculation in the second stage are 32 bits, a multiplication performed by the CPU according to the embodiment is executed only for the input of the number of bits equal to or less than 16 bits as mentioned above. Thus, when the data are stored in the four registers (at step S2-1), the input data must be truncated into 16-bit data. The input data is truncated by rightwardly shifting by a predetermined bit width (at step S2-2). At this point, the decrease of the dynamic range of the input data is determined by the number of bits shifted. For example, assuming that the gain in the case that data is not shifted is 0 dB, when the data is rightwardly shifted by one bit, the gain is decreased to −6 dB. When the input data is rightwardly shifted by two bits, the gain is decreased to −12 dB.

When the input data with a bit width of 32 bits is rightwardly shifted, the gain thereof is decreased. However, without such a shifting operation, according to the embodiment, the CPU cannot perform parallel multiplications as mentioned above. After data has been shifted by the predetermined bit width and a multiplication shown in FIG. 3 has been performed, the addition of two 32-bit products is executed as mentioned above (at step S2-3). In order to get the resultant data, this operation is repeatedly executed. The dynamic range is decreased every product-sum calculation. Thus, the dynamic range of the resultant data is also decreased.

In particular, in the case of a fast Fourier transform (FFT) calculation or a filter calculation, the output data of a product-sum calculation is used successively and repeatedly. After the calculation is performed, before the finally calculated result is output, the decreased dynamic range should be recovered. Thus, contrariwise to the truncation of 32-bit data into 16 bit-data, the input data is leftwardly shifted by the predetermined bit width. Consequently, the output data can be obtained without a decrease of gain (at step S2-4). For example, as in the forementioned example, when data is rightwardly shifted by two bits at step S2-2 and thereby the gain is decreased to −12 dB, by leftwardly shifting the data by two bits at step S2-4, the gain can be recovered. In this example, the rightward bit shifting operation is performed one time. However, when the rightward bit shifting operation is performed repeatedly, the leftward bit shifting operation should be performed in the same number of times as the above.

Next, another embodiment of the present invention will be explained. In this embodiment, plural data are stored in the same register and the same calculations for the plural data are executed in parallel.

In this example, a parallel calculation in the case that one 64-bit register is constituted of four 16-bit registers and all the four registers are used will be explained. It is assumed that the CPU has an instruction set for 16-bit data multiplication and 32-bit data addition.

When input data is 32-bit data, data extracted from a file is stored in register 0 (at step S6-1). The data is rightwardly shifted by 16 bits in register 0 (at step S6-2). Thus, the resultant 16-bit data is stored in part A of register 1 (at step S6-3). This operation is applied to parts B, C, and D of register 1 (at steps S6-1 to S6-4). The same operation is applied to register 2. Thus, four 16-bit data are stored in register 2 (at step S6-5 to S6-8).

The content of part A of register 1 (that is denoted by register 1-A; this notation is applied to the other registers) and the content of register 2-A are multiplied. The content of register 1-B and the content of register 2-B are multiplied.

The content of register 1-C and the content of register 2-C are multiplied. The content of register 1-D and the content of register 2-D are multiplied. These multiplications are performed with one instruction at a time. The result of each multiplication is 32-bit data. For example, the product of the content of register 1-A and the content of register 2-A is outputted to register 1-A and register 2-A. The sum stored in register 1-A and register 2-A, and the sum stored in register 1-B and register 2-B are summed up and stored in the high-order 32 bits of register 1.

Likewise, the sum stored in register 1-C and register 2-C and the sum stored in register 1-D and register 2-D are summed up and then stored in the low-order 32 bits of register 1. These two additions are performed with one instruction at a time (at step S6-9).

In the case that one 64-bit register is constituted of four 16-bit registers, when all the four 16-bit registers are used, four multiplications can be processed in parallel. Thus, when 32-bit input data is truncated into 16-bit data, since the number of multiplication steps can be decreased, the digital audio signal can be processed at high speed. When data is truncated, since the gain of the input data is decreased, the truncated data must be leftwardly shifted so as to recover the gain (at steps S6-10 and S6-11). This operation can be accomplished by transferring high-order 32 bits of register 1 to register 0 and leftwardly shifting data stored in registers 0 and 1.

In the above description, an embodiment of a process of a digital audio signal was explained. However, when applying the method of the present invention to a process of a digital video signal, the same effects can be obtained.

Next, an example of calculations performed by the CPU according to first embodiment of the present invention will be explained in detail. In this example, apart of a sub-band dividing filter calculation that is used for an audio signal process and the like will be explained.

Input data has been stored in an external storing unit such as a hard disk. It is assumed that the bit width of the input data is 16 bits and the bit width of the final output data is 16 bits. The structure of the registers is shown in FIG. 3. Multiplications are performed in 16 bits. Additions are performed in 32 bits. In addition, all calculations are of fixed-point calculation.

First of all, 16-bit data is input (at step S7-1). 16-bit window functions are multiplied. In this case, since the bit width is 16 bits, no bit shifting operation is performed. The product is 32-bit (at step S7-2). Next, the products are multiplied again.

Since the bit width of the products is 32 bits, the data should be truncated into 16 bits. In this embodiment, by shifting the products by six bits, data is truncated into 16-bit data (at step S7-3). The products are shifted by six bits instead of 16 bits because the products are represented by 22 bits. With the truncation, the gain is decreased.

After data is truncated into 16-bit data, 16-bit data are multiplied and 32-bit data is output (at step S7-4). Next, the resultant products are summed. Since an addition is performed with 32-bit data, no truncation is performed. In this case, addition of 32-bit products is executed eight times (at step S7-5).

In the additions, the decrease of the gain due to the bit shifting operation can be compensated. However, the gain is increased more than the original gain. However, since the final output data has a bit width of 16 bits, a truncation into 16-bit data is performed. Then data is rightwardly shifted by seven bits and thereby 32-bit data is truncated into 16-bit data (at step S7-6). At this point, the gain of the resultant data is lower than the gain of the input data.

Next, 16-bit data are summed (at step S7-7). However, since data has been leftwardly shifted by seven bits, the gain of resultant sum is decreased by 6 dB as compared to the gain of input data because of the rightward shift executed just before. Thus, to restore the gain of the input data, the sum of 16 bit is leftwardly shifted by one bit. Thus, the equality of the dynamic range between input and output can be assured (at step S7-8).

As mentioned above, in a CPU or DSP that has a structure for executing a high speed calculation, when the bit width of the internal calculations is smaller than the bit width of the input data, by leftwardly shifting the output data of the signal process by the predetermined bit width, the decreased gain can be recovered. In addition, by applying the bit width controlling method to the CPU or DSP that has the structure and instructions for parallel calculation, the parallel calculation can be executed for input data having a different bit width from that of the parallel calculation, thereby resulting in an increase of overall speed of signal processing.

Although the present invention has been shown and described with respect to best mode embodiments thereof, it should be understood by those skilled in the art that the foregoing and various other changes, omissions, and additions in the form and detail thereof maybe made therein without departing from the spirit and scope of the present invention.

What is claimed is:

1. A bit width controlling method for a data processor which performs high-speed fixed-point calculation with data of a fixed number of bits, which comprises the steps of:

within said data processor, truncating an input signal of which the bit width is different from said fixed number of bits prior to said high-speed fixed-point calculation;

performing said high-speed fixed-point calculation within said data processor; and within said data processor, shifting the result of said high-speed fixed-point calculation by the number of bits which is required to compensate for a reduced amount of gain caused by said truncating step, thereby preventing the gain of an intermediate or final output signal from changing as compared to said input signal.

2. The bit width controlling method according to claim 1, wherein said input signal is audio signal.

3. A method for controlling the bit width of a data processor performing a parallel multiplication process of an input signal represented by bits of data comprising the steps of:

a) loading a first and third register with a first and third n-bit data, b) loading a second and fourth register with second and fourth n-bit data c) multiplying said first and second n-bit data together while simultaneously multiplying said third and fourth n-bit data together to obtain fifth and sixth m-bit data, where m>n, d) adding said fifth and sixth m-bit data together to obtain an m-bit sum data, e) shifting said m-bit sum data to the right to truncate k least significant bits of said sum bit data to produce m-k bit shifted sum data where k<n, f) repeating steps a)–d) at least once with said m-k bit shifted sum data loaded into one of said first through fourth registers, g) for each repetition of step f), shifting said sum data of step d) to the left by a number of bits required to compensate for a reduced amount of gain caused by said shifting step e), to produce an output data.

4. The method as recited in claim 3 wherein said input signal is an audio signal.

* * * * *